(12) United States Patent
Bayona-Carrillo

(10) Patent No.: US 12,116,122 B2
(45) Date of Patent: Oct. 15, 2024

(54) ALUMINUM-COPPER-LITHIUM ALLOY PRODUCT FOR A LOWER WING SKIN ELEMENT WITH IMPROVED PROPERTIES

(71) Applicant: CONSTELLIUM ISSOIRE, Issoire (FR)

(72) Inventor: Nicolas Bayona-Carrillo, Voiron (FR)

(73) Assignee: CONSTELLIUM ISSOIRE, Issoire (FR)

( * ) Notice: Subject to any disclaimer, the term of this patent is extended or adjusted under 35 U.S.C. 154(b) by 807 days.

(21) Appl. No.: 17/061,055

(22) Filed: Oct. 1, 2020

(65) Prior Publication Data

US 2021/0016869 A1 Jan. 21, 2021

Related U.S. Application Data

(63) Continuation of application No. 15/100,768, filed as application No. PCT/FR2014/000256 on Dec. 2, 2014, now Pat. No. 10,836,464.

(30) Foreign Application Priority Data

Dec. 5, 2013 (FR) ...................................... 13/02833

(51) Int. Cl.
| C22C 21/16 | (2006.01) |
| B21B 3/00 | (2006.01) |
| B21J 1/00 | (2006.01) |
| B64C 3/26 | (2006.01) |
| C22C 21/12 | (2006.01) |

(Continued)

(52) U.S. Cl.
CPC ................. *B64C 3/26* (2013.01); *B21B 3/00* (2013.01); *B21J 1/003* (2013.01); *C22C 21/14* (2013.01); *C22C 21/16* (2013.01); *C22F 1/057* (2013.01); *B21B 2003/001* (2013.01)

(58) Field of Classification Search
None
See application file for complete search history.

(56) References Cited

U.S. PATENT DOCUMENTS

| 5,032,359 | A | | 7/1991 | Pickens et al. |
| 5,198,045 | A | * | 3/1993 | Cho ........................ C22F 1/057 |
| | | | | 420/533 |
| 5,455,003 | A | | 10/1995 | Pickens et al. |

(Continued)

FOREIGN PATENT DOCUMENTS

| CN | 101341267 A | 1/2009 |
| EP | 1966402 B1 | 12/2006 |

(Continued)

OTHER PUBLICATIONS

Lee et al., "Effect of Microstructure and Load Ratio on Fatigue Crack Growth Behavior of Advanced Al—Cu—Li—Mg—Ag Allowys" Metals and Materials. (1997) vol. 3, No. 1: 51-59.

(Continued)

*Primary Examiner* — George Wyszomierski
*Assistant Examiner* — Janell C Morillo
(74) *Attorney, Agent, or Firm* — McBee Moore & Vanik IP, LLC

(57) ABSTRACT

The invention relates to a method for manufacturing a laminated or forged material, the thickness of which is 14 to 100 mm. The materials according to the invention are particularly suitable for manufacturing airplane underwing elements.

18 Claims, 1 Drawing Sheet

(51) Int. Cl.
   *C22C 21/14*   (2006.01)
   *C22F 1/057*   (2006.01)

(56) References Cited

U.S. PATENT DOCUMENTS

| | | |
|---|---|---|
| 7,229,509 B2 | 6/2007 | Cho et al. |
| 8,771,441 B2 | 7/2014 | Bes et al. |
| 2009/0159159 A1 | 6/2009 | Danielou et al. |
| 2011/0278397 A1 | 11/2011 | Bes et al. |
| 2013/0092294 A1* | 4/2013 | Eberl ................. C22C 21/16 148/552 |
| 2013/0255839 A1 | 10/2013 | Heymes et al. |
| 2016/0237532 A1* | 8/2016 | Danielou ............. B22D 11/059 |

FOREIGN PATENT DOCUMENTS

| | | |
|---|---|---|
| EP | 1891247 A1 | 2/2008 |
| WO | 2010/055225 A1 | 5/2010 |
| WO | 2011/141647 A2 | 11/2011 |

OTHER PUBLICATIONS

International Search Report mailed Jul. 9, 2015, in counterpart International Application No. PCT/FR/2014000256.

* cited by examiner

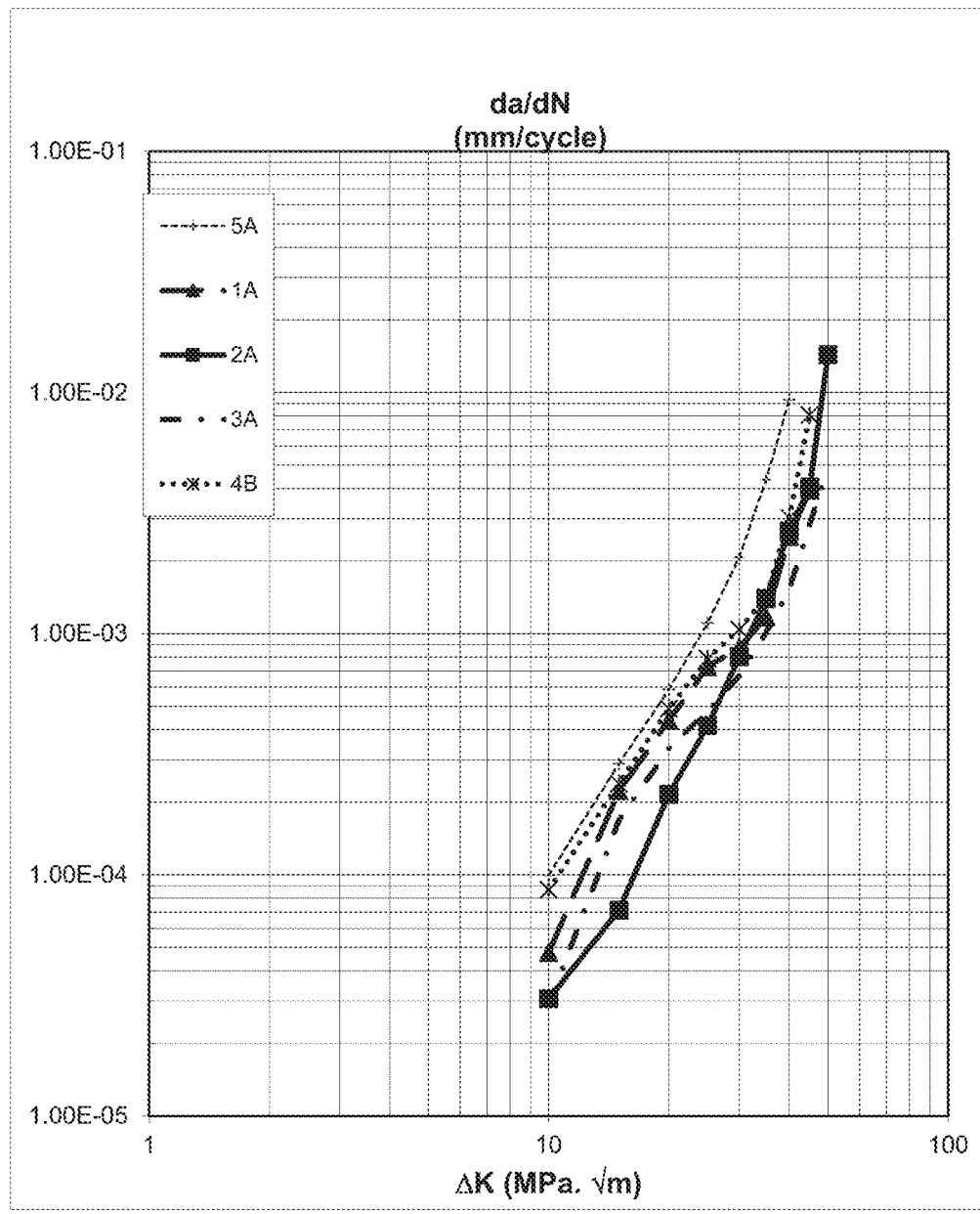

ALUMINUM-COPPER-LITHIUM ALLOY PRODUCT FOR A LOWER WING SKIN ELEMENT WITH IMPROVED PROPERTIES

CROSS-REFERENCE TO RELATED APPLICATIONS

This application is a continuation of U.S. patent application Ser. No. 15/100,768, filed 1 Jun. 2016, which is a National Stage entry of International Application No. PCT/FR2014/000256, filed 2 Dec. 2014, which claims priority to French Patent Application No. 13/02833, filed 5 Dec. 2013. The disclosure of the priority applications are incorporated in their entirety herein by reference.

BACKGROUND

Field of the Invention

The present invention in general relates to aluminum alloy products and, more particularly, such products, their use and manufacturing processes, in particular in the aerospace industry.

Description of Related Art

A continuous research effort is being made in order to develop materials which can simultaneously reduce the weight and increase the effectiveness of the structures of high-performance aircraft. Aluminum-lithium alloys (AlLi) are of great interest in this respect, because lithium can reduce the density of aluminum by 3% and increase the modulus of elasticity by 6% for each percent by weight of added lithium.

U.S. Pat. No. 5,032,359 describes a vast family of aluminum-copper-lithium alloys in which the addition of magnesium and silver, in particular between 0.3 and 0.5 percent by weight, makes it possible to increase the mechanical strength.

U.S. Pat. No. 5,198,045 describes a family of alloys comprising (as a % by weight) (2.4-3.5) Cu, (1.35-1.8) Li, (0.25-0.65) Mg, (0.25-0.65) Ag, (0.08-0.25) Zr. Wrought products made from these alloys combine a density less than 2.64 g/cm3 and a valuable compromise between mechanical strength and toughness.

U.S. Pat. No. 7,229,509 describes a family of alloys comprising (as a % by weight) (2.5-5.5) Cu, (0.1-2.5) Li, (0.2-1.0) Mg, (0.2-0.8) Ag, (0.2-0.8) Mn, (up to 0.4) Zr or other refiners such as Cr, Ti, Hf, Sc and V. The examples given have an improved compromise between mechanical strength and fracture toughness but their density is greater than 2.7 g/cm$^3$.

Patent EP 1,966,402 describes an alloy that does not contain zirconium designed for fuselage plates with a primarily recrystallized structure comprising (as a % by weight) (2.1-2.8) Cu, (1.1-1.7) Li, (0.2-0.6) Mg, (0.1-0.8) Ag, and (0.2-0.6) Mn.

Patent EP 1,891,247 describes an alloy designed for fuselage plates comprising (as a % by weight) (3.0-3.4) Cu, (0.8-1.2) Li, (0.2-0.6) Mg, (0.2-0.5) Ag and at least one element chosen from Zr, Mn, Cr, Sc, Hf and Ti, in which the Cu and Li contents meet the condition Cu+5/3 Li<5.2.

U.S. Pat. No. 5,455,003 describes a process for the production of aluminum-copper-lithium alloys with improved properties of mechanical strength and fracture toughness at cryogenic temperatures. This process applies in particular to an alloy comprising (as a % by weight) (2.0-6.5) Cu, (0.2-2.7) Li, (0-4.0) Mg, (0-4.0) Ag, (0-3.0) Zn.

International application WO 2010/055225 describes a method in which a liquid metal bath is prepared comprising 2.0 to 3.5% by weight of Cu, 1.4 to 1.8% by weight of Li, 0.1 to 0.5% by weight of Ag, 0.1 to 1.0% by weight of Mg, 0.05 to 0.18% by weight of Zr, 0.2 to 0.6% by weight of Mn and at least one element selected from Cr, Sc, Hf and Ti, the amount of the element, if selected, being 0.05 to 0.3% by weight for Cr and Sc, 0.05 to 0.5% by weight for Hf and 0.01 to 0.15% by weight for Ti, the remainder being aluminum and inevitable impurities; a rough shape is cast from the liquid metal bath and homogenized to form said rough shape at a temperature between 515° C. and 525° C. so that the equivalent time at 520° C. for homogenization is between 5 and 20 hours.

International application WO2011/141647 relates to an aluminum alloy comprising, as percentages by weight, 2.1 to 2.4% of Cu, 1.3 to 1.6% of Li, 0.1 to 0.5% of Ag, 0.2 to 0.6% of Mg, 0.05 to 0.15% of Zr, 0.1 to 0.5% of Mn, 0.01 to 0.12% of Ti, optionally at least one element chosen from among Cr, Sc, and Hf, the quantity of the element, if it is chosen, being from 0.05 to 0.3% for Cr and Sc, 0.05 to 0.5% for Hf, a quantity of Fe and Si each less than or equal to 0.1 and inevitable impurities at a content of less than or equal to 0.05 each and 0.15 in total. The alloy can be used to produce extruded, rolled and/or forged products particularly suitable for the manufacture of elements for the aircraft lower wing skins.

The article by Le Chang-Soon et al "Effect of microstructure and load ratio on fatigue crack growth behavior of advanced Al—Cu—Li—Mg—Ag alloys", Metals and Materials, Vol 3 Issue 1 (1997) pp 51-59 describes the behavior of fatigue crack growth on three Al—Cu—Li—Mg—Ag alloys for loading ratios of 0.1 and 0.75.

Alloy AA2196 comprising (as percentages by weight) (2.5-3.3) Cu, (1.4-2.1) Li, (0.25-0.8) Mg, (0.25-0.6) Ag, (0.04-0.18) Zr, and at the most 0.35 Mn, and alloy AA2296 comprising (as percentages by weight) (2.1-2.8) Cu, (1.3-1.9) Li, (0.20-0.8) Mg, (0.25-0.6) Ag, (0.04-0.18) Zr, (0.05-050) Mn, and alloy AA2076 (2.0-2.7) Cu, (1.2-1.8) Li, (0.20-0.8) Mg, (0.15-0.40), Ag (0.05-0.16) Zr, (0.05-0.50) Mn are also known.

Certain parts intended for aircraft construction require a particular compromise of properties that these known alloys and products do not make it possible to attain. In particular, parts used in the manufacture of lower wing skins for aircraft require very high fracture toughness, yet with sufficient mechanical resistance and advantageous fatigue properties, especially for spectrum fatigue. These properties have to be thermally stable, i.e. they must not change significantly during aging treatment at a temperature such as 85° C. Obtaining all these properties simultaneously with the lowest possible density is a desirable compromise of properties.

SUMMARY

There is a need for an Al—Cu—Li alloy product that is thermally stable, of low density, and with high toughness and resistance to fatigue crack growth but of sufficient mechanical strength, for aeronautical applications and in particular for lower wing skin element applications.

A first object of the invention is a method of manufacturing a rolled or forged product in which:
(a) a slab of alloy is cast, of composition, as a percentage by weight,
Cu: 1.8-2.6
Li: 1.3-1.8,
Mg: 0.1-0.5
Mn: 0.1-0.5 and Zr<0.05 or Mn<0.05 and Zr 0.10-0.16
Ag: 0-0.5
Zn<0.20
Ti: 0.01-0.15
Fe: <0.1
Si: <0.1
other elements<0.05 each and <0.15 total, the remainder aluminum with a density less than 2.670 g/cm3,
(b) said slab is homogenized at 480 to 540° C. for 5 to 60 hours,
(c) said slab is hot worked by rolling and/or forging, the hot working conditions being such when the manganese content is 0.1 to 0.5% by weight and the zirconium content is less than 0.05% by weight the final hot working temperature is at least 400° C. or when the manganese content is less than 0.05% by weight and the zirconium content is between 0.10 and 0.16% by weight the final hot working temperature is at the most 400° C. to obtain a rolled and/or forged product having a thickness of between 14 and 100 mm,
(d) said product is solution heat treated at 490 to 530° C. for 15 minutes to 8 hours,
(e) it is quenched with water,
(f) said product undergoes controlled stretching with a permanent deformation of 1 to 6%,
(g) said product is artificially aged by heat treatment at 120 to 170° C. for 5 minutes to 100 hours.

Another object of the invention is a rolled and/or forged product obtainable by the process according to the invention, whose thickness is between 20 mm and 50 mm and the yield strength at mid-thickness TYS (L) is at least 390 MPa, the toughness KappL-T (W=406 mm) is at least 105 MPa√m even after aging for 3,000 hours at 85° C. and the number of cycles in condition 6.5 MPa √m<ΔK<16.6 MPa√m at least 250,000 for a fatigue test performed according to ASTM standard E647 on CCT type test specimen of width W=160 mm sampled in direction LT at ¼ thickness or whose thickness is between 14 mm and 100 mm characterized in that at mid-thickness the volume fraction of grains having a brass texture is between 25 and 40% and the texture index is between 12 and 18.

Yet another object of the invention is the use of a product according to the invention as a structural element in aircraft construction, and preferably as an aircraft lower wing skin element.

DESCRIPTION OF THE FIGURE crack growth velocity da/dN measured according to standard E647

DETAILED DESCRIPTION OF A PREFERRED EMBODIMENT

Unless otherwise specified, all the indications concerning the chemical composition of the alloys are expressed as a percentage by weight based on the total weight of the alloy. The designation of alloys is compliant with the rules of The Aluminium Association, known to those skilled in the art. The density depends on the composition and is determined by calculation rather than by a method of weight measurement. The values are calculated in compliance with the rules of The Aluminium Association, which is described on pages 2-12 and 2-13 of "Aluminum Standards and Data". The definitions of the metallurgical tempers are indicated in European standard EN 515.

Unless otherwise specified, the static mechanical properties, in other words the ultimate tensile strength UTS, the tensile yield stress TYS and elongation at rupture E, are determined by a tensile test according to standard EN 10002-1 or NF EN ISO 6892-1, the place at which the specimen are held and their orientation being defined by standard EN 485-1.

The stress intensity factor (K) is determined according to ASTM E 399. The proportion of test specimen defined in paragraph 7.2.1 of this standard is always checked as is the general procedure described in paragraph 8. ASTM standard E 399 gives, in paragraphs 9.1.3 and 9.1.4, criteria for determining whether K is a valid value of $K_{1c}$. So a value $K_{1C}$ is always a K value but the converse is not true. Within the framework of the invention, the criteria of paragraphs 9.1.3 and 9.1.4 of standard ASTM E399 are not always respected; however for a given test specimen geometry, the values of $K_Q$ presented are always comparable with one another, the test specimen geometry making it possible to obtain a valid value of $K_{1C}$ not always being accessible given the constraints related to the dimensions of the plates or profiles. Within the framework of the invention, the thickness of the selected test specimen is a thickness considered as suitable by those skilled in the art to obtain a valid value for $K_{1C}$.

The values of the apparent stress intensity factor at break ($K_{app}$) and the stress intensity factor at break ($K_c$) are as defined in standard ASTM E561.

The fatigue crack growth test at room temperature was performed in accordance with standard ASTM E647. The present inventor used a CCT type specimen of width W=160 mm, taken in the direction L-T at ¼ thickness, and thickness B=5 mm. The specimen was pre-cracked by fatigue loading in accordance with the recommendations of the standard. This practice makes it possible start the propagation test on a straight, acute crack, remote from the mechanical notch. For the propagation test, the specimen was loaded cyclically with a constant load amplitude. The test frequency was also kept constant during the test, as was the load ratio R=0.1.

The present inventor recorded the number of cycles under the conditions mentioned above in a crack size range such that the condition 6.5 MPa√m<ΔK<16.6 MPa√m was respected.

Unless otherwise specified, the definitions of standard EN 12258 apply.

"Structural element" of a mechanical construction here refers to a mechanical part for which the static and/or dynamic mechanical properties are particularly important for the performance of the structure, and for which a structural analysis is usually prescribed or performed. These are typically elements whose failure is likely to endanger the safety of said construction, its users or others. For an aircraft, these structural elements include the parts which make up the fuselage (such as the fuselage skin, stringers, bulkheads, circumferential frames), the wings (such as the wing skin, stringers or stiffeners, ribs and spars) and the tail unit, made up of horizontal and vertical stabilizers, as well as floor beams, seat tracks and doors. The crystallographic texture can be described by a 3-dimensional mathematical function. This function is known in the trade as the Orientation Density Function (ODF). It is defined as the volume fraction of material dV/V having a g±dg orientation:

$$\frac{dV/V}{dg} = f(g) = f(\varphi_1, \Phi, \phi_2)$$

where $(\phi_1, \Phi, \phi_2)$ are the Euler angles describing the orientation g.

The present inventor has calculated the ODF of each plate using the method of spherical harmonics from four pole FIGURES measured by X-ray diffraction on a conventional texture goniometer. In the context of the invention the pole FIGURE measurements were performed on test samples cut in the mid-thickness of the plates. Similarly, in order to obtain statistically representative measurements, the sample size was adapted to the grain size.

It is possible to simplify the information in the ODF. This is commonly done in the trade to describe selected aspects of the orientation distribution in the material. An example of this is the texture index called "I". The texture index informs on the acuity of the crystallographic texture without giving details on the nature of it. It is equal to unity for a material with a random distribution of orientations, but its value increases when the textures are more strongly marked. The texture index I is calculated with the following equation:

$$I = \int [f(g)]^2 dg$$

Another way to simplify the information in the ODF is to calculate the volume fraction of crystallites that have a specific orientation. To do this, one arbitrarily defines the reference orientation and an angle of maximum disorientation around this orientation. The ODF is then integrated into the domain so defined, which makes it possible to deduce the relative volume of orientations in this domain relative to the total volume. The present inventor used a tolerance of 15° around "copper", "brass" and "S" orientations in order to describe the texture obtained. The "copper", "brass" and "S" crystallographic orientations are known to those skilled in the art and are described for example in the reference document by U. F. Kocks, C. N. Tomé and H.-R. Wenk, "Texture and anisotropy: preferred orientations in polycrystals and their effect on materials properties". Cambridge University Press, 2000. The "copper", "brass" and "S" orientations are given in the table below.

| Name | Indices | Bunge $(\phi_1, \Phi, \phi_2)$ | Kocks $(\Psi, \Theta, \Phi)$ |
|---|---|---|---|
| Copper | {112} <11$\bar{1}$> | 90, 35, 45 | 0, 35, 45 |
| S | {123} <63$\bar{4}$> | 59, 37, 63 | 149, 37, 27 |
| Brass | {110} <$\bar{1}$12> | 35, 45, 0 | 55, 45, 0 |

Unexpectedly, the inventor found that the combination of certain Al—Cu—Li alloy compositions with precise thermo-mechanical transformation conditions made it possible to obtain products having a particular crystallographic texture, resulting in a very favorable compromise between mechanical strength, toughness, resistance to fatigue crack growth and thermal stability whose density is less than 2.670 g/cm3. The products according to the invention are obtained by a process including steps of casting, homogenization, hot working, solution heat-treatment, quenching, stress relieving and aging.

First an alloy slab according to the invention is cast.

The copper content of the alloy for which the surprising effect is observed is between 1.8 and 2.6% by weight. Preferably, the copper content is at most 2.5%. In one embodiment of the invention, the maximum copper content is 2.3% or preferably 2.2% by weight. Preferably, the copper content is at least 1.9 or preferably 1.95% by weight.

The lithium content lies between 1.3 and 1.8% by weight. Advantageously the lithium content is at least 1.35 and preferably 1.4% by weight. Advantageously the lithium content is at the most 1.65 or preferably 1.6% by weight.

The silver content lies between 0 and 0.5% by weight. In an advantageous embodiment of the invention, the silver content is between 0.05 and 0.25% by weight. In one embodiment of the invention, which has the advantage of minimizing density, the silver content is at the most 0.05% by weight.

The magnesium content is between 0.1 and 0.5% by weight. Preferably, the magnesium content is at most 0.4% by weight. In an advantageous embodiment of the invention the magnesium content is at least 0.2% by weight.

The present inventor found that the desirable properties of the products according to the invention can be obtained in two embodiments as far as the addition of manganese and zirconium is concerned.

In a first embodiment manganese is added at a content of between 0.1 and 0.5% by weight and preferably between 0.2 and 0.4% by weight, while limiting the zirconium content to less than 0.05% by weight and preferably to less than 0.04% by weight.

In a second embodiment zirconium is added at a content of between 0.10 and 0.16% by weight and preferably between 0.11 and 0.15% by weight, while limiting the manganese content to less than 0.05% by weight and preferably to less than 0.04% by weight. The simultaneous addition of zirconium and manganese does not give the properties of fatigue, toughness and mechanical strength of the products according to the invention.

The alloy also contains from 0.01 to 0.15% by weight of Ti and preferably 0.02 to 0.10% by weight in order to control the grain size during casting.

It is preferable to limit the content of the inevitable impurities of the alloy in order to obtain the most favorable damage tolerance properties. The inevitable impurities include iron and silicon; these elements each have a content of less than 0.1% by weight and preferably a content of less than 0.08% by weight and 0.06% by weight for iron and silicon, respectively; the other impurities each have a content of less than 0.05% by weight and 0.15% by weight in total. Preferably, the zinc content is less than 0.20% by weight and preferably less than 0.04% by weight. In one embodiment of the invention the zinc content is less than 0.05% by weight, the silicon content is less than 0.08% by weight and the iron content is less than 0.08% by weight. The density of the alloy at room temperature is less than 2.670 g/cm³. Preferably, the composition is adjusted in order to obtain a density at room temperature of less than 2.640 g/cm3, still more preferably less than 2.630 g/cm3. The slab is then homogenized. The homogenization temperature is preferably between 480 and 540° C. for 5 to 60 hours. Preferably, the homogenization temperature is between 490° C. and 510° C.

After homogenization, the slab is generally cooled down to room temperature before being preheated ready for hot working by rolling and/or forging. The purpose of preheating is to reach an initial working temperature preferably ranging between 420 and 520° C. and preferably around 430° C. to 460° C. allowing the rough shape to be worked.

Hot working is performed by rolling and/or forging. Preferably the slab is essentially worked by rolling so as to obtain a plate.

The hot working temperature depends on the composition of the slab.

In the embodiment in which the manganese content is 0.1 to 0.5% by weight and the zirconium content is less than 0.05 by weight, the hot working conditions are such that the final hot working temperature is at least 400° C. and preferably at least 410° C. In the embodiment in which the manganese content is less than 0.05% by weight and the zirconium content is between 0.10 and 0.16% by weight, the hot working temperature conditions are such that the final hot working temperature is at most 400° C., preferably at most 390° C. and even more preferably at most 380° C.

The product obtained in this way then undergoes solution heat-treatment preferably by heat treatment between 490 and 530° C. for 15 min to 8 hours, then quenched typically with water.

The product then undergoes controlled stretching from 1 to 6% and preferably at least 2%, typically about 4%. In one embodiment of the invention, cold rolling with a reduction ranging between 5% and 15% is performed before the controlled stretching step. Known steps such as flattening and/or shaping may optionally be performed before or after controlled stretching.

Artificial aging is performed at a temperature between 120 and 170° C. for 5 to 100 hours preferably between 140 and 160° C. for 20 to 60 hours. Preferably the artificial aging is such that the equivalent time t(eq) at 155° C. is between 20 and 40 hours and preferably between 25 and 35 hours. Equivalent time t(eq) at 155° C. is defined by the formula:

$$t(eq) = \frac{\int \exp(-11400/T)dt}{\exp(-11400/T_{ref})}$$

where T (in Kelvin) is the instantaneous treatment temperature, which changes with time t (in hours), and $T_{ref}$ is a reference temperature set at 428 K. t(eq) is expressed in hours. The constant Q/R=11400 K is derived from the activation energy of the diffusion of Li, Q=95000 J/mol. The formula giving t(eq) takes account of the heating and cooling phases.

Preferred tempers for plates are T8 tempers, more specifically T84 or T86.

The combination of desirable properties—low density, toughness and high resistance to fatigue crack growth, thermal stability and sufficient mechanical strength—is difficult to achieve simultaneously. Within the framework of the invention, it is surprisingly possible to combine a low density with a very advantageous compromise of properties.

The method according to the invention is used to manufacture, rolled and/or forged products. Advantageously, the method according to the invention is used to manufacture plates.

The method according to the invention is particularly advantageous to obtain rolled products of Al—Cu—Li alloy that are thermally stable, of low density and with high fracture toughness and fatigue resistance, but with sufficient mechanical strength, for aerospace applications. Of rolled products, plates at least of 14 mm thick and preferably at least 20 mm and/or at the most 100 mm and preferably at the most 60 mm thick are advantageous.

Advantageously, the plates obtained by the method according to the invention comprises, at mid-thickness in the T84 temper for a thickness of between 20 mm and 50 mm
- a tensile yield strength TYS in direction L of at least 390 MPa and preferably of at least 395 MPa and
- fracture toughness $K_{app}$(L-T) measured on specimen of width W=406 mm, at least 105 MPa√m after artificial aging and even after long-term aging for 3,000 hours at 85° C.,
- a number of cycles in condition 6.5 MPa√m<ΔK<16.6 MPa√m of at least 250,000 and preferably of at least 280,000 for a fatigue test performed according to ASTM E647 on CCT type specimen of width W=160 mm taken in direction L-T at ¼ thickness.

The present inventor found that the presence of Zr or Mn, in conjunction with a suitable hot working temperature both act on the control of texture making it possible to obtain a texture such that at mid-thickness the volume fraction of grains having a brass texture is between 25 and 40% and the texture index is between 12 and 18. This particular texture associated with the composition makes it possible to simultaneously achieve efficiency in terms of mechanical strength, fatigue fracture toughness, and very favorable thermal stability.

The products according to the invention can be used as structural elements, in particular for aircraft construction.

In an advantageous embodiment of the invention, the products according to the invention are used as elements for aircraft lower wing skins.

EXAMPLES

Example 1

5 alloys were cast in the form of slabs. Their composition and calculated density are given in Table 1. Alloys 3 and 4 have a composition according to the invention. Alloy 5 is a reference alloy already mentioned in patent application WO2011/141647.

TABLE 1

| | Chemical composition (% by weight) and calculated density | | | | | | | | | |
|---|---|---|---|---|---|---|---|---|---|---|
| Alloy | Si | Fe | Cu | Mn | Mg | Ti | Zr | Li | Ag | Density |
| 1 | 0.017 | 0.027 | 2.73 | 0.00 | 0.00 | 0.029 | >0.12 | 1.60 | 0 | 2.630 |
| 2 | 0.026 | 0.026 | 2.69 | 0.00 | 0.37 | 0.032 | >0.12 | 1.55 | 0 | 2.629 |
| 3 | 0.016 | 0.036 | 2.47 | 0.33 | 0.35 | 0.035 | 0.030 | 1.50 | 0 | 2.633 |
| 4 | 0.015 | 0.029 | 2.09 | 0.00 | 0.34 | 0.036 | 0.13 | 1.57 | 0.16 | 2.620 |
| 5 | 0.030 | 0.052 | 2.21 | 0.38 | 0.28 | 0.039 | 0.13 | 1.46 | 0.25 | 2.639 |

The slabs were homogenized for 12 hours at 508° C. (alloys 1 to 4) or 8 hours at 520° C. (alloy 5). After homogenization, the slabs were heated and hot-rolled. For alloys 1 to 4 two hot-rolling conditions were tested.

The description of the hot rolling conditions and the references of the corresponding plates are given in Table 2.

155° C., and alloy 5 plates, for which the optimum conditions had already been determined, was artificial aged for 36 hours at 155° C.

The results obtained on industrial scale plates are given in Table 4

TABLE 2

Hot rolling conditions

| Plate reference | Alloy | Preheating temperature (° C.) | Preheating time h | Initial hot rolling temperature T (° C.) | Final hot rolling temperature (° C.) | Final thickness (mm) |
|---|---|---|---|---|---|---|
| 1A | 1 | 492.0 | 12.0 | 466 | 360 | 35 |
| 1B | 1 | 492.0 | 12.0 | 463 | 448 | 35 |
| 2A | 2 | 492.0 | 12.0 | 473 | 372 | 35 |
| 2B | 2 | 492.0 | 12.0 | 465 | 449 | 35 |
| 3A | 3 | 492.0 | 12.0 | 444 | 410 | 35 |
| 3B | 3 | 492.0 | 12.0 | 443 | 317 | 35 |
| 4A | 4 | 492.0 | 12.0 | 442 | 458 | 35 |
| 4B | 4 | 492.0 | 12.0 | 441 | 365 | 35 |
| 5A | 5 | 492.0 | 12.0 | 470-490 | 470-490 | 40 |

The plates obtained in this way were solution heat-treated at 497+/−2° C. (1A to 4B) or 524+/−2° C. (5A), quenched with water and stretched with a permanent elongation of about 4%. Different artificial aging conditions were tested on samples of modest size.

The static mechanical characteristics of the plates were measured in the L direction, as well as the fracture toughness on specimen of width 406 mm and thickness B=6.35 mm, in the L-T direction. The static mechanical properties and fracture toughness were measured at mid-thickness. In addi-

TABLE 3

Mechanical properties obtained after different artificial aging tests

| Reference | Stretching | Temperature (° C.) | Time h | UTS MPa | TYS MPa | E % | Kq Mpa√m |
|---|---|---|---|---|---|---|---|
| 1A | 4% | 140 | 20 | 378 | 299 | 10.6 | 48.01 |
| 1A | 4% | 140 | 40 | 433 | 363 | 10.1 | 51.93 |
| 1A | 4% | 140 | 80 | 477 | 419 | 11.4 | 40.12 |
| 1A | 4% | 140 | 160 | 507 | 461 | 12.4 | 28.66 |
| 1B | 4% | 140 | 20 | 375 | 291 | 11.3 | 48.25 |
| 1B | 4% | 140 | 40 | 424 | 351 | 11.2 | 52.29 |
| 1B | 4% | 140 | 80 | 478 | 422 | 11.2 | 39.46 |
| 1B | 4% | 140 | 160 | 506 | 462 | 12.3 | 29.00 |
| 2A | 4% | 140 | 20 | 419 | 321 | 13.4 | 52.79 |
| 2A | 4% | 140 | 40 | 460 | 380 | 13.1 | 52.60 |
| 2A | 4% | 140 | 80 | 511 | 458 | 10.8 | 43.23 |
| 2A | 4% | 140 | 160 | 537 | 500 | 10.3 | 34.45 |
| 2B | 4% | 140 | 20 | 410 | 307 | 15.4 | |
| 2B | 4% | 140 | 40 | 448 | 365 | 11 | 53.51 |
| 2B | 4% | 140 | 80 | 502 | 447 | 10.9 | 41.72 |
| 2B | 4% | 140 | 160 | 528 | 488 | 11.3 | 34.59 |
| 3A | 4% | 140 | 20 | 369 | 274 | 17.1 | 44.95 |
| 3A | 4% | 140 | 40 | 402 | 322 | 14.5 | 52.26 |
| 3A | 4% | 140 | 80 | 451 | 393 | 12.6 | 57.11 |
| 3A | 4% | 140 | 160 | 487 | 449 | 11.2 | 48.95 |
| 3B | 4% | 140 | 20 | 341 | 250 | 22.7 | 43.45 |
| 3B | 4% | 140 | 40 | 370 | 292 | 20.2 | 50.13 |
| 3B | 4% | 140 | 80 | 423 | 365 | 14.9 | 53.64 |
| 3B | 4% | 140 | 160 | 462 | 423 | 12.4 | 44.39 |
| 4A | 4% | 155 | 13 | 379 | 289 | 13.8 | 48.89 |
| 4A | 4% | 155 | 18 | 394 | 313 | 13.6 | 50.82 |
| 4A | 4% | 155 | 30 | 426 | 360 | 11 | 55.09 |
| 4A | 4% | 155 | 60 | 461 | 415 | 11.1 | 46.16 |
| 4B | 4% | 155 | 13 | 390 | 306 | 14 | 49.29 |
| 4B | 4% | 155 | 18 | 405 | 329 | 11.1 | 51.80 |
| 4B | 4% | 155 | 30 | 437 | 377 | 11.3 | 52.55 |
| 4B | 4% | 155 | 60 | 475 | 433 | 11.9 | 44.33 |

The tests were used to determine optimal artificial aging treatment conditions for the T84 temper of industrial scale plates: alloy plates 1 and 2 were artificial aged for 40 hours at 140° C., alloy 3 plates was artificial aged for 80 hours at 140° C. and alloy 4 plates was artificial aged for 30 hours at tion, fatigue was measured under spectrum loading representative of the lower wing skin conditions of a commercial aircraft according to the specifications of an aircraft manufacturer on CCT type specimen, 12 mm thick, 700 mm long and 200 mm wide, having a notch of 30 mm. The specimen for characterizing fatigue under spectrum loading were taken so as to be centered 11 mm below the surface of the plate. The fatigue under spectrum loading results were obtained after fatigue pre-cracking until this crack reached 40 mm. The result is the number of flights between 50 mm and 130 mm of crack growth.

Fatigue crack growth velocity was also measured according to standard E647 on a CCT type test piece of width W=160 mm taken in the direction L-T at ¼ thickness and thickness B=5 mm. The specimen was pre-cracked by fatigue loading in accordance with the recommendations of the standard. For the propagation test, the specimen was loaded cyclically with a constant load amplitude. The test frequency was also kept constant during the test, as was the load ratio R=0.1.

TABLE 4

Mechanical tests on industrial plates

| | Fatigue test according to standard E6467 | | | UTS TYS (L) MPa | Kapp (L) Mpa | L-T MPa$\sqrt{m}$ | Fatigue under spectrum loading number of flights |
|---|---|---|---|---|---|---|---|
| | mm/cycle at $\Delta K = 10$ MPa$\sqrt{m}$ | Cycles of 6.6 to 16.5 MPa$\sqrt{m}$ | Steam pressure daPa | | | | |
| 1A | 4.77E-05 | 439070 | ≥100 | 383 | 444 | 110 | 7078 |
| 1B | — | — | — | 381 | 444 | 111 | 6849 |
| 2A | 3.06E-05 | 504912 | ≥100 | 417 | 480 | 117 | 6508 |
| 2B | — | — | — | 405 | 472 | 113 | 6900 |
| 3A | 2.91E-05 | 472231 | ≥100 | 411 | 459 | 117 | 6922 |
| 3B | — | — | — | 382 | 429 | 115 | 6687 |
| 4A | — | — | — | 381 | 438 | 114 | 6499 |
| 4B | 8.67E-05 | 284597 | ≥100 | 396 | 448 | 113 | 6841 |
| 5A | 9.97E-05 | 181985 | ≥100 | 434 | 474 | 117 | 5235 |

Thermal stability was tested by treatment for 3,000 hours at 85° C. The difference from the values obtained at the end of artificial aging is shown in the Table 5. Only certain plates were tested but for the same alloy and the same artificial aging treatment it is expected that the thermal stability would be similar, regardless of the hot rolling conditions. The present inventor is therefore convinced that the thermal stability of 1B and 2B plates would be significantly less favorable than that of plates 3 A and 4B

TABLE 5

Effect of thermal exposure for 3,000 h at 85° C.

Variation in properties after heat exposure for 3,000 h at 85° C.

| | $\Delta$TYS L t/2 MPa | $\Delta$Kapp L-T t/2 Mpa$\sqrt{m}$ |
|---|---|---|
| 1A | +95 | -14 |
| 2A | +97 | -19 |
| 3A | +80 | -1 |
| 4B | +98 | -4 |
| 5A | +53 | — |

Plates 3A and 4B have a particularly favorable compromise of properties. In particular Yield strength TYS (L) greater than 390 MPa Fracture toughness $K_{app}$L-T (W=406 mm) of at least 105 MPa$\sqrt{m}$ after 3,000 hours at 85° C.

Spectrum fatigue under spectrum greater than 6,700 flights

A number of cycles in condition 6.5 MPa$\sqrt{m}<\Delta K<16.6$ MPa$\sqrt{m}$ of at least 250,000

The present inventor has characterized the texture of these particularly favorable plates and found that they have common characteristics.

The texture properties are given in Table 6.

TABLE 6

Results of the texture measurements

| | volume fraction of copper texture (%) | volume fraction of brass texture (%) | volume fraction of S texture (%) | Texture index |
|---|---|---|---|---|
| 1A | 8.2 | 32.3 | 39.0 | 16.1 |
| 1B | 7.0 | 36.9 | 38.6 | 20.1 |

TABLE 6-continued

Results of the texture measurements

| | volume fraction of copper texture (%) | volume fraction of brass texture (%) | volume fraction of S texture (%) | Texture index |
|---|---|---|---|---|
| 2A | 9.6 | 32.6 | 35.7 | 15.0 |
| 2B | 5.7 | 34.3 | 41.7 | 21.1 |
| 3A | 6.3 | 31.6 | 32.0 | 14.8 |
| 3B | 3.4 | 14.9 | 15.9 | 3.6 |
| 4A | 7.7 | 36.7 | 39.2 | 19.5 |
| 4B | 8.7 | 29.8 | 38.5 | 15.4 |
| 5A | 6.4 | 35.2 | 36.4 | 16.4 |

In particular their volume fraction of brass texture grains is between 25 and 40% and their texture index is between 12 and 18. Plates 1A and 2A have similar texture properties close to the plates according to the invention 3A and 4B, but their thermal stability is not satisfactory, which could be related to the copper content. Similarly plate 5A shows a texture close to the plates according to the invention but the simultaneous presence of manganese and zirconium seems to have a detrimental effect on its fatigue properties. Plate 4B has the advantage of having a lower density than plate 3A for comparable properties.

The invention claimed is:

1. A rolled and/or forged product having a thickness of between 20 and 100 mm, wherein at mid-thickness the volume fraction of grains having a brass texture is between 25 and 40% and the texture index is between 12 and 18, wherein the rolled and/or forged product is produced by a process comprising (a) casting a slab of alloy comprising, as a percentage by weight,
Cu: 1.9-2.3
Li: 1.3-1.8
Mg: 0.1-0.5
Mn: <0.05
Zr: 0.10-0.16
Ag: 0-0.5
Zn: <0.20
Ti: 0.01-0.15
Fe: <0.1
Si: ≤0.1
other elements<0.05 each and <0.15 total, the remainder aluminum with a density less than 2.670 g/cm³, (b) homogenizing said slab at 480 to 540° C. for 5 to 60 hours, (c) hot working said slab by rolling and/or forging, the hot working conditions being such that a final hot working temperature is at the most 400° C. to obtain a rolled and/or forged product having a thickness of between 20 and 100 mm, (d) solution-heat treating said product at 490 to 530° C. for 15 minutes to 8 hours, (e) quenching said product with water, (f) controlled stretching said product with a permanent deformation of 1 to 6%, (g) right after controlled stretching said product, artificially aging said product by heat treatment at 120 to 170° C. for 20 to 60 hours.

2. The rolled and/or forged product according to claim 1, wherein the lithium content of said alloy ranges between 1.4 and 1.6% by weight.

3. The rolled and/or forged product according to claim 1, wherein the magnesium content of said alloy ranges between 0.1 and 0.4% by weight.

4. The rolled and/or forged product according to claim 1, wherein the silver content of said alloy ranges between 0.05 and 0.25% by weight.

5. The rolled and/or forged product according to claim 1, wherein the zinc content of said alloy is less than 0.05% by weight, the silicon content of said alloy is less than 0.08% by weight and the iron content of said alloy is less than 0.08% by weight.

6. The rolled and/or forged product according to claim 1 wherein aging is such that the equivalent time t(eq) at 155° C. is between 20 and 40 hours, equivalent time t(eq) at 155° C. being defined by the formula:

$$t(eq) = \frac{\int \exp(-11400/T)dt}{\exp(-11400/T_{ref})}$$

where T (in Kelvin) is the instantaneous treatment temperature, which changes with time t (in hours), and $T_{ref}$ is a reference temperature set at 428 K., and t(eq) is expressed in hours.

7. The rolled and/or forged product according to claim 6, wherein the equivalent time t(eq) at 155° C. is between 25 and 35 hours.

8. The rolled and/or forged product according to claim 1 whose thickness is between 20 mm and 50 mm and whose tensile yield strength at mid-thickness TYS (L) is at least 390 MPa, the fracture toughness KappL-T (W=406 mm) is at least 105 MPa√m after aging for 3,000 hours at 85° C. and the number of cycles in condition 6.5 MPa√m<ΔK<16.6 MPa√m is at least 250,000 for a fatigue test performed according to ASTM E647 on CCT type specimens of width W=160 mm taken in direction L-T at ¼ thickness.

9. The rolled and/or forged product according to claim 8, wherein the tensile yield strength at mid-thickness TYS (L) is at least 395 MPa.

10. The rolled and/or forged product according to claim 8, wherein the number of cycles in condition 6.5 MPa√m<ΔK<16.6 MPa√m is at least 280,000.

11. The product according to claim 1 as a structural element in aircraft construction, optionally as an aircraft lower wing skin element.

12. The rolled and/or forged product according to claim 1, wherein the titanium content of said alloy ranges between 0.02 and 0.10% by weight.

13. The rolled and/or forged product according to claim 1, wherein the density of the slab of alloy is less than 2.640 g/cm³.

14. The rolled and/or forged product according to claim 1, wherein in (b), said homogenizing is at a temperature between 490 to 510° C. for 5 to 60 hours.

15. The rolled and/or forged product according to claim 1, wherein in (a), the slab of alloy consists essentially of, as a percentage by weight,
Cu: 1.9-2.3
Li: 1.3-1.8
Mg: 0.1-0.5
Mn: <0.05
Zr: 0.10-0.16
Ag: 0-0.5
Zn: <0.20
Ti: 0.01-0.15
Fe: <0.1
Si: ≤0.1
other elements<0.05 each and <0.15 total, the remainder aluminum with a density less than 2.670 g/cm³.

16. The rolled and/or forged product according to claim 1 wherein Zr: 0.11-0.15 wt. %.

17. The rolled and/or forged product according to claim 1 wherein Mn<0.04 wt. %.

18. The rolled and/or forged product according to claim 1 wherein Zr: 0.11-0.15 wt. % and Mn<0.04 wt. %.

* * * * *